S. R. WRIGHT & C. L. DEIHLE.
RAILWAY SELECTIVE APPARATUS.
APPLICATION FILED AUG. 24, 1908.

928,571.

Patented July 20, 1909.
6 SHEETS—SHEET 1.

WITNESSES:
Clarence W. Carroll
W. Gurnee

INVENTORS:
Selden R. Wright
Charles L. Deihle

S. R. WRIGHT & C. L. DEIHLE.
RAILWAY SELECTIVE APPARATUS.
APPLICATION FILED AUG. 24, 1908.

928,571.

Patented July 20, 1909.
6 SHEETS—SHEET 2.

WITNESSES:
Clarence W. Carroll
D. Gurnee

INVENTORS:

S. R. WRIGHT & C. L. DEIHLE.
RAILWAY SELECTIVE APPARATUS.
APPLICATION FILED AUG. 24, 1908.

928,571.

Patented July 20, 1909.
6 SHEETS—SHEET 3.

WITNESSES:

INVENTORS:

S. R. WRIGHT & C. L. DEIHLE.
RAILWAY SELECTIVE APPARATUS.
APPLICATION FILED AUG. 24, 1908.

928,571.

Patented July 20, 1909.

WITNESSES:
Clarence W Carroll
D. Gurnee

INVENTORS:
Selden R. Wright
Charles L. Deihle

S. R. WRIGHT & C. L. DEIHLE.
RAILWAY SELECTIVE APPARATUS.
APPLICATION FILED AUG. 24, 1908.

928,571.

Patented July 20, 1909.
6 SHEETS—SHEET 5.

WITNESSES:

INVENTORS:

UNITED STATES PATENT OFFICE.

SELDEN R. WRIGHT AND CHARLES L. DEIHLE, OF ROCHESTER, NEW YORK, ASSIGNORS TO TELEGRAPH SIGNAL COMPANY, OF ROCHESTER, NEW YORK, A CORPORATION OF NEW YORK.

RAILWAY SELECTIVE APPARATUS.

No. 928,571.     Specification of Letters Patent.     Patented July 20, 1909.

Application filed August 24, 1908. Serial No. 450,086.

*To all whom it may concern:*

Be it known that we, SELDEN R. WRIGHT and CHARLES L. DEIHLE, citizens of the United States, and residents of Rochester, in the county of Monroe and State of New York, have invented certain new and useful Improvements in Railway Selective Apparatus, of which the following is a specification.

This invention relates to railway selective apparatus, and consists in the mechanism herein described and claimed.

The object of the invention is to provide means whereby a translating device may be operated at any selected station on the line, without operating the one at any other signal. The translating device may set a semaphore or ring a bell.

In the drawings.

The master selector (Figs. 1 and 2) comprises a motor, and a movable switch or contact that is actuated thereby upon change of the electrical condition of an electromagnet. The said motor, in the present instance, consists of a clock mechanism 1, the primary shaft 2 of which is actuated by means of a weighted cord 3 wound upon a drum 4. The motor is fixed to a suitable support 5 that may be attached to a wall. An electromagnet 6 is mounted within the motor-frame, and when energized, moves a pivoted armature 7. One end of a shaft 8 is held against said armature by the action of a spring 9 that presses against a pinion 10 fixed on the shaft. Said pinion meshes with the motor, and the shaft 8 is thus revolved continuously as long as the motor runs. The outer end of the shaft 8 carries a friction disk 11 that constitutes one member of a friction clutch. A disk 12, fixed to a separate shaft 13, constitutes the other member of the clutch. The shaft 13 is revolubly supported in bearings 14 and 15, and carries the movable switch or contact 16.

Figure 1:
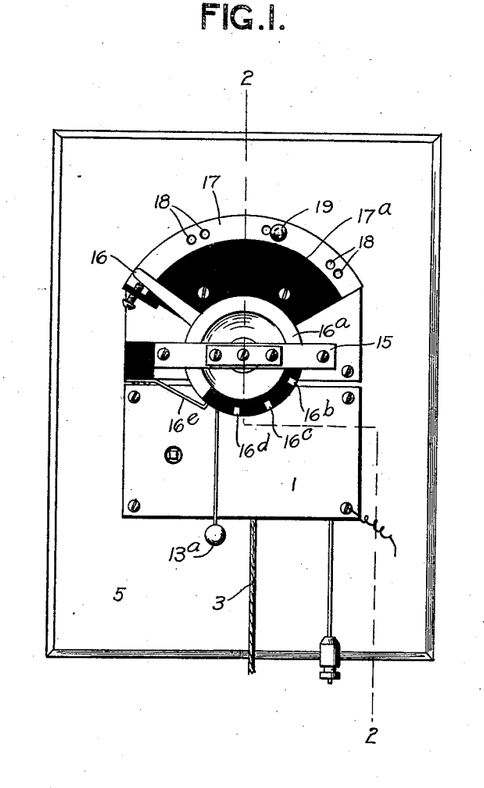
—Figure 1 is a front elevation of a master selector or transmitter.
Figure 2:
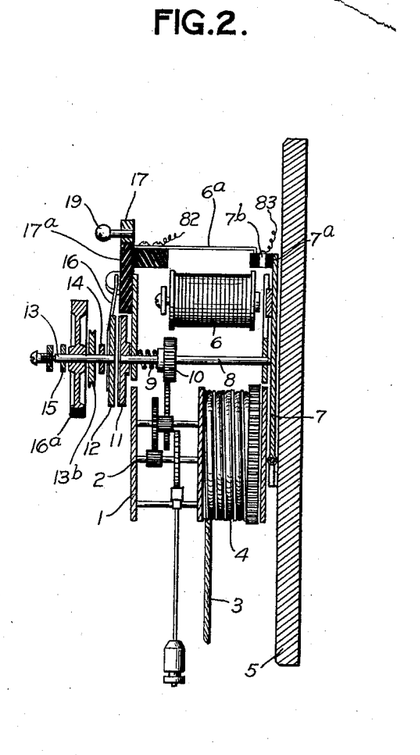
Fig. 2 is a vertical section thereof, on the line 2—2 of Fig. 1.
Figure 2:
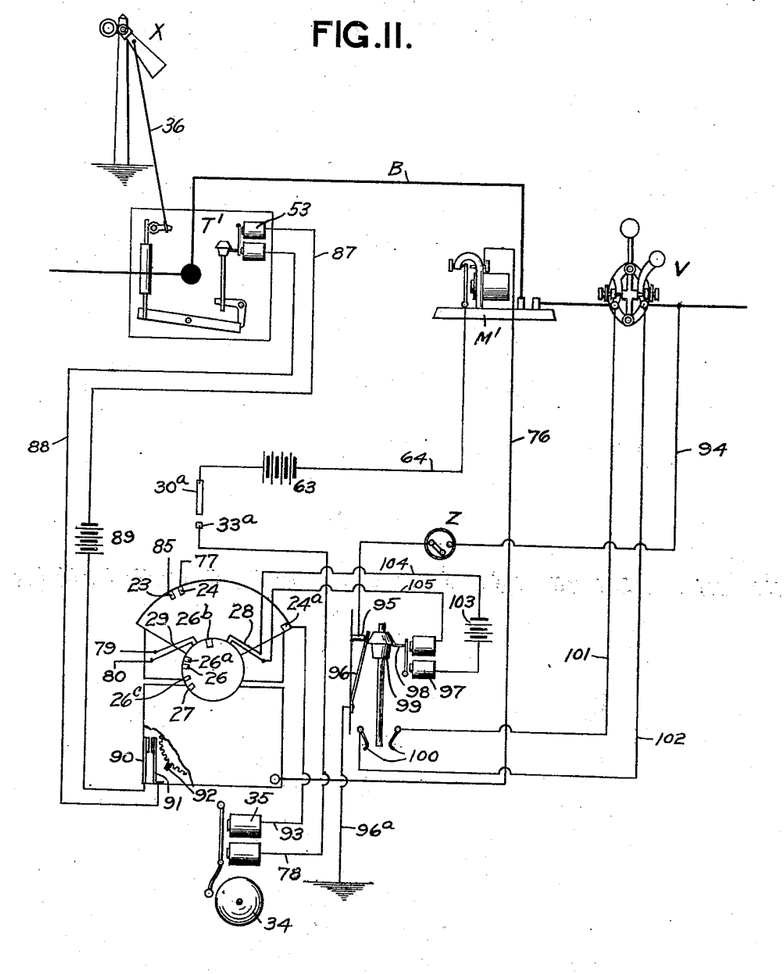

Above the motor-frame is an arc 17 of metal, insulated from the said frame by a vulcanite support 17ª. In said arc are holes or sockets 18, any one of which is adapted to receive the metal plug 19 that constitutes a variable contact. It is obvious that no electrical connection between the motor-frame 1 and the plug 19 is possible, except through the movable contact 16 when the latter has been moved by the motor mechanism a sufficient distance to bring it against said plug. Thus movement occurs only when the magnet 6 is energized, thus clutching the shaft 13 into connection with the shaft 8.

A disk 16ª is fixed to the shaft 13, and carries a series of contact-strips 16ᵇ, 16ᶜ and 16ᵈ insulated from each other. Said contact-strips are adapted to connect electrically two brushes 16ᵉ which bear on the periphery of the disk 16ª. Said connection takes place when the contact 16 is in a certain position, hereinafter described.

On the armature 7 of the electromagnet 6 is a non-conducting block 7ª (Fig. 2) in which is a metal strip 7ᵇ. A brush 6ª rests normally on the block 7ª but when the armature is moved by the magnet, the brush 6ª rests upon the strip 7ᵇ, and forms an electrical connection therewith.

The local selector (Figs. 3, 4 and 5), one of which is placed at each station on the line, is constructed like the master selector except as to certain fixed contacts thereon.

All the motors throughout the system are identical and therefore, when adjusted, run at exactly the same speed.

Figure 3:
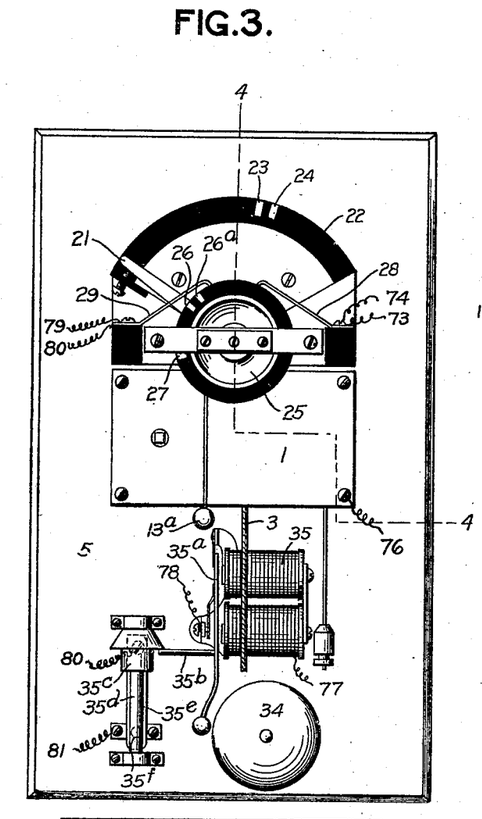
Fig. 3 is a front elevation of a local selector or receiver.
Figure 4:
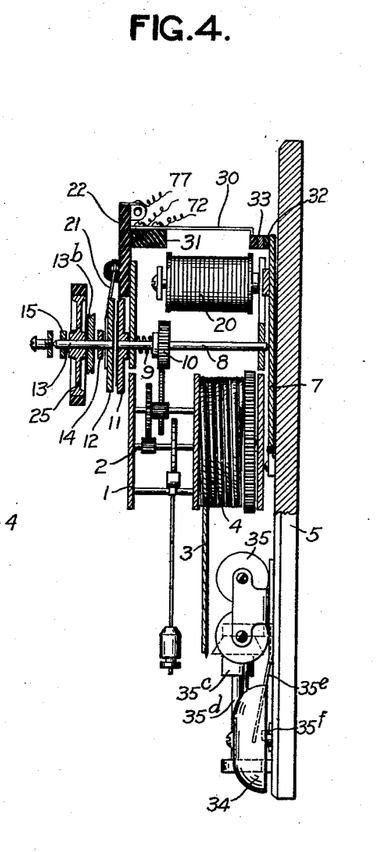
Fig. 4 is a vertical section on the line 4—4 of Fig. 3.
Figure 5:
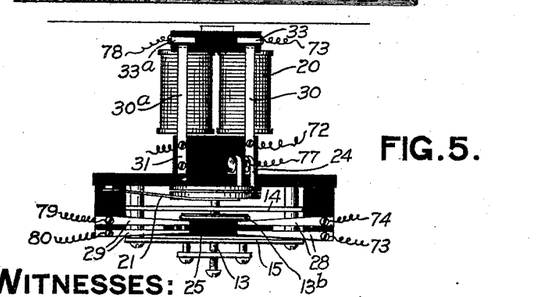
Fig. 5 is a top plan of certain parts of the same instrument.

The electromagnet 20 on the local selector, when energized, throws the clutch members 11 and 12 into engagement and the movable switch or contact 21 is carried around, passing over the non-conducting sector 22. In said sector on each local selector are fixed contacts 23 and 24, across which the movable contact 21 passes. These fixed contacts are used for energizing two different translating devices in accordance with the setting of the master selector. The contacts 23 and 24 on each local selector are differently placed, but correspond to the position of one pair of the holes 18 on the master selector. The said contacts are comparatively close together on each instrument, as shown. If the movable contacts of all the instruments on the line, including those of the master selector, are started at the same instant (by simultaneously energizing all the electromagnets for operating the friction clutches), the said movable contacts will advance synchronously, and the contact 16 on the master selector will strike the plug 19 at the same instant that the movable contact 21 makes an electrical connection with the contact 23 on the local selector in which the position of said contact 23 corresponds to the position of said plug. The movable contacts on all the instruments are restored simultaneously to a zero position by the action of a weight $13^a$ that is hung on a cord that runs in a grooved pulley $13^b$ on the shaft 13, and constitutes a restoring mechanism.

A disk 25 (Fig. 4) is fixed upon the shaft 13 and has a rim of insulating material in which are set metal contacts 26, $26^a$ and 27. The contacts 26 and $26^a$ are adapted to connect the ends of twin brushes 28, and conduct current from one brush to the other to complete a "holding" circuit, while the movable contact 21 is passing over the fixed contact 23 and a translating device is energized, in this case for setting a semaphore. An electrical circuit is completed through another pair of brushes 29 and the contact 27 and a translating device is energized, in this case to ring a bell or similar device, when the contact 21 passes over the contact 24, and at the same instant a different "holding" circuit is formed through the brushes 28 and the contact 26, to maintain energization of the magnet 20 for a certain interval of time. Each holding circuit comprises a circuit controller, consisting of a brush 30, fixed at one end to a vulcanite block 31, and bearing at the opposite end upon a similar block 32 that is fixed to the upper end of the swinging armature 7. In the block 32 is set a metal strip 33 (Fig. 5), which, when the magnet 20 is deënergized, is not in contact with the brush 30, but does touch the latter when said magnet is energized. A similar circuit controller, consisting of a brush $30^a$ making contact with another strip $33^a$ upon the block 32, closes the circuits of the translating devices when the magnet 20 is energized, so that unless the selector magnet is energized and the movable contact 21 is on a fixed contact, the translating device is not energized.

The bell 34, which is used as a calling signal, may be fixed to the plate 5 beneath the motor 1, and may be rung by the usual make-and-break electromagnet 35. The armature $35^a$ of the magnet 35 carries a stud or pin $35^b$. Said stud normally supports a weight $35^c$ by projecting under a shoulder thereon, but when the bell rings, the said stud is removed and the said weight falls. As the latter is slidably mounted on a guide rod $35^d$, it falls along the said rod, and when at the bottom thereof, strikes a spring $35^e$ which is forced into contact with a button $35^f$. Through this contact and the brushes 29, an electrical circuit is closed, which is hereinafter described. Replacing the weight $35^c$ in position on the stud $35^b$ after the bell has stopped ringing, releases the spring $35^e$ and breaks said circuit.

Figure 6:
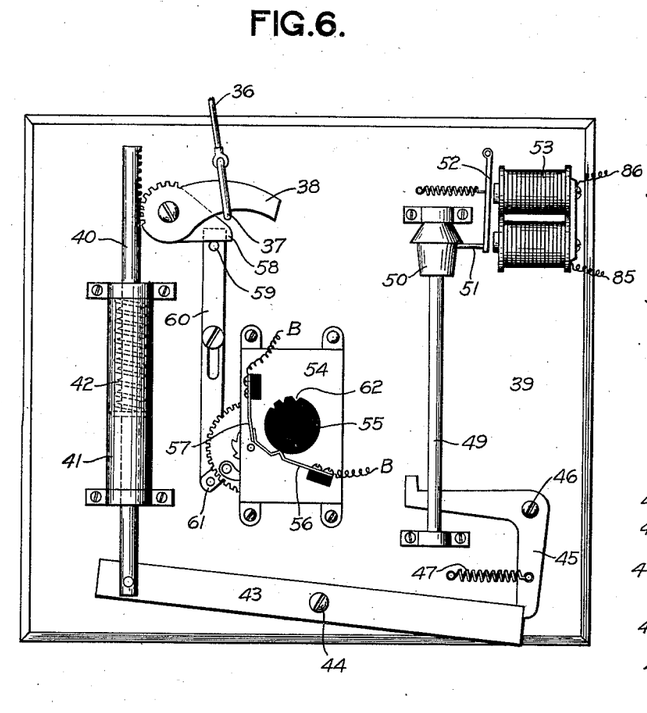
Fig. 6 is a front elevation of the semaphore releasing device.
Figure 7:
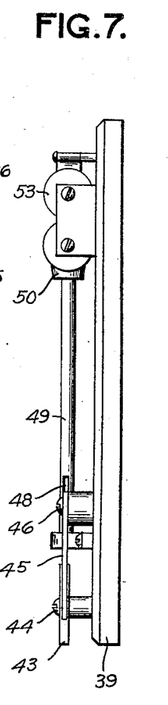
Fig. 7 is an end elevation thereof.

The semaphore releasing device or trip (Figs. 6 and 7) may be placed at a point convenient for connection with the downhaul cord 36 leading to a semaphore blade outside the station. Said cord has at its lower end a ring 37, which may be slipped over a hook 38 that is pivoted on a board or plate 39. The hook 38 has a segmental gear on one end that meshes with a vertical rack-bar 40. The latter is guided in a tube 41 and is pressed downward by a coiled spring 42 therein. Attached to the lower end of said rack-bar is one end of a lever 43 that is pivoted at 44. The opposite end of the lever is held, against the action of the spring 42, in the position shown in Fig. 6, by engaging a notch in the end of a bell-crank 45 that is pivoted at 46. Said bell-crank is maintained in engagement with the lever 43 by a spring 47. The horizontal arm of the bell-crank 45 extends through a slot 48 in a fixed vertical guide-rod 49. On said guide-rod is slidably mounted a weight 50, that is normally supported on a projecting pin 51 on the armature 52 of an electromagnet 53. When said electromagnet is energized, the armature 52 pulls the pin 51 away from the weight 50, and the latter falls, striking the bell-crank 45. Said bell-crank is thus disengaged from the lever 43, and the spring 42 then pushes the bar 40 downward, which movement turns the hook 38 upward and permits the ring 37 to slip off. The semaphore blade is then carried to the danger position by its counterweight in the usual manner. The parts are reset by the station operator, who replaces the weight 50 on the pin 51 after the magnet 53 is deënergized, and pulls the lever 43 down until it engages the bell-crank 45 again. The ring 37 may then be replaced on the hook 38, which movement carries the semaphore to the safety position.

Mounted on the plate 39 is a spring-actuated motor 54 which has a ratchet connection with a non-conducting disk 55. A flat spring 56, supported on the frame of said motor and insulated therefrom, rests on the periphery of the disk 55 and is thus held in contact with a similar conductor 57. The motor 54 is partially wound up when the hook 38 is pulled down to the position shown in Fig. 6. An arm 58 fixed to said hook is adapted to strike a stud 59 that projects from a vertically guided bar 60, and to force the latter downward. At its lower end the bar 60 connects with a crank 61 on the spring-shaft of the motor. When the hook 38 flies up as before described, the bar 60 is no longer held down by the stud 59, and the motor is free to unwind. The disk 55 is thus rotated by the aforesaid ratchet connection, and makes one complete revolution. Notches 62 are formed in the periphery of the said disk and the spring 56 enters each in succession, alternately breaking and making connection with the conductor 57. This mechanism constitutes an indicator controller which actuates a suitable indicator such as the sounder K at the master selector station, and thus informs the operator there that the semaphore has been set.

Figure 8:
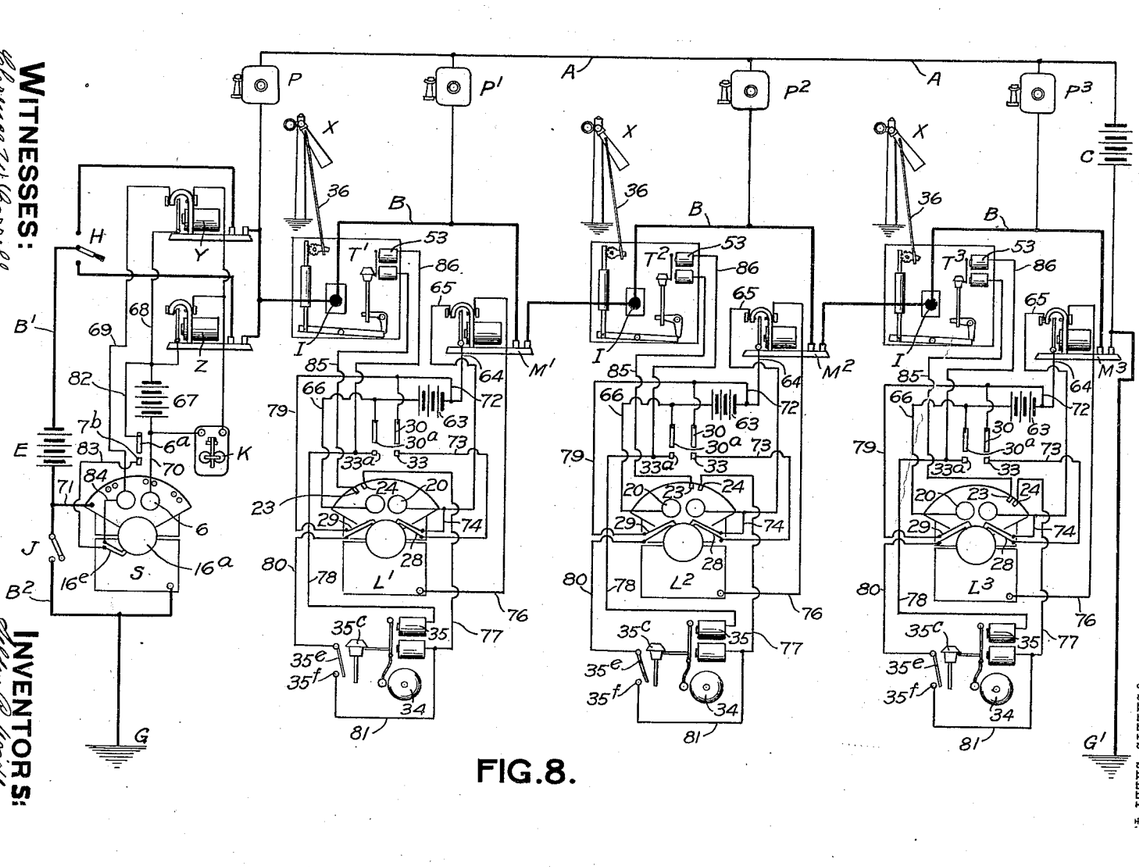
Fig. 8 is a diagram of the apparatus showing its connection with a telephone line and a series of semaphores.

In Fig. 8 is shown a method of using the instruments just described for operating a selected signal at a distant station in connection with a telephone line. A and B are the positive and negative line wires, respectively, of a telephone circuit, in which the telephones P, P', P² and P³ are connected in parallel. Current for the telephone circuit is supplied from a suitable source of energy C. The master selector S is located at the station on the line from which it is desired to control the operations hereinafter described. Usually this station is at one terminal of the line as shown, and a local selector is placed at each station on the line. In Fig. 8, three of said local selectors are indicated, L', L² and L³. At each local station is also a semaphore-relating device or trip mechanism T', T² and T³, respectively, each controlling a semaphore X in the manner hereinbefore described. The line-wire B is connected to the brushes 56 and 57 (Fig. 6) and thus is continuous through the tell-tale or indicating mechanism I on each trip. Said line-wire is also connected through a telegraph relay M', M² and M³ at each local station, and to a pair of similar relays Y and Z at the selector station. The wire B is grounded at each end, as at G and G'. In the wire B' that leads to the ground G, is placed a battery E, and thus a circuit may be established through the wire B and the ground, independently of the second telephone wire A and of the source of energy C. A double-throw switch H is placed in the wire B' whereby either relay Y or Z may be cut in. The said wire B' can also be connected to the ground through the arc 17 and the frame of the motor 1 of the selector S. A shunt B² around the selector S is controlled by a switch J. Normally, the switch H being open, no current flows from the battery E through the line B; and the telephone circuit formed by the line-wires A and B, and the battery C is also broken until the receiver of one of the telephones is taken down. The relays M', M² and M³ and Y are therefore deënergized, and their armatures rest against the back-contact on the frame of each. In this position of the armature, a local circuit is closed at each station whereby the electromagnet on each local selector and on the master selector is energized, and the movable contacts are thrown into engagement with the continuously-running motors. The current then flows from the local battery 63 at each local selector through the wire 64, relay armature and back-contact wire 65 to magnet 20, and thence to battery through wire 66. At the master station, when no current is on the line B, the local battery 67 sends current through the wire 68 and back-contact of the armature of relay Y to the wire 69, whence it flows through the magnet 6 and the wire 70 to the battery. By this current change in the wire B, the clutches of the master selector and of all the local selectors are engaged, and the movable contacts then travel to the ends of their respective paths of movement, where they remain until current flows through the line B. The latter condition may obtain either when the switch H is closed, or when the receiver of one or more telephones T, etc. is taken down.

When the operator at the transmitting station wishes to call up an operator at the local station L³, he may ring the bell 34 at the desired local selector at will. To do so, he closes the line B by throwing the switch H to cut in the relay Y. This breaks the circuits through which the magnets 6 and 20 are energized, disengages all the clutches, and the movable contacts on all the instruments drop back to zero. He then places the plug 19 in the hole 18 on the selector which corresponds in position to the contact 24 on the local selector L³, and then breaks the line B by opening the switch J. The armatures of all the relays on the line immediately drop against their respective back-contacts and reëstablish the magnet-energizing circuits just described. The movable contacts on the master selector and on all the local selectors move upward synchronously; and when the contact 16 strikes the plug 19, the line B is instantly closed, because current may then find a path from the ground to the negative pole of the battery E through the motor of the selector, the movable contact 16, plug 19, arc 17 and the wire 71. The movable contact 21 on the selected local selector, say, for instance, on the instrument L³, covers the contact 24 thereon at the instant the contact 16 closes the line. As the armatures of all the line relays are attracted to their front-contacts when the line is closed, the magnets 6 and 20 are deënergized, and the movable contacts on all the instruments except l³ drop back to zero. On the latter instrument a circuit is established when the contact 21 is on the contact 24 whereby its magnet 20 is held energized for a time. When the aforesaid contacts 21 and 24 are together, the brushes 28 rest on the metal strip 26, and a circuit is established as follows: from battery 63, through wire 72, brush 30, contact 33, wire 73, brushes 28, contact 26, wire 74, through magnet 20, and to battery through wire 66. The magnet 20 is thus held energized and the contact 21 moves until the contact 26 has passed the ends of the brushes 28, when the circuit is broken, thus deënergizing the said magnet, and the contact 21 returns to zero. While the contact 21 is on the contact 24, the bell-ringing circuit is established whereby the bell 34 on the instrument L³ is rung. Said circuit is: from battery 63, through wire 64, relay armature and front-contact, wire 76 to motor, through motor, movable contacts 21, fixed contact 24 to wire 77, through bell-magnet 35, wire 78, to contact 33ª, brush 30ª, and wire 66 to battery, thus ringing the bell 34, which, as before described, drops the weight 35°. Said weight brings together the spring 35ᵉ and post 35ᶠ. In the further movement of the movable contact 21, when either of the contact strips 26, 26ª or 27 touches the brushes 29, a circuit is closed through which the ringing of the bell is continued to attract the operator's attention in case he failed to hear it the first time. The circuit is: from battery 63, through wire 79, brushes 29, wire 80, spring 35ᵉ, post 35ᶠ, wire 81, bell-magnet 35, wire 78, contact 33ª, and brush 30ª to battery.

If the operator at the master selector wishes to release the semaphore at any local station, he may do so by performing the following operations: He first closes the switch J, and cuts in the relay Y by means of the switch H. This closes the line B, and the movable contacts on all the motors are returned to zero as before described. The operator next places the plug 19 in the hole on the arc 17 which is in a position corresponding to the contact 23 at the selected local station, then opens the switch J (which places the contacts of the master selector in the main line circuit) and throws the switch H over to cut out relay Y and to cut in relay Z, whereby the indicator or sounder K is retained in a local circuit but the master selector magnet is placed in a circuit controlled by the brushes 16ᵉ and by the "holding" contacts 6ª and 7ᵇ. The line thus being opened again, the instruments operate the movable contacts as before, and at the exact time when the contact 21 of the selected local selector is passing over the contact 23 thereon, the contact 16 on the master selector S strikes the plug 19 and the line is again closed. As in the bell-ringing operation, a "holding" circuit is closed through the brushes 30 and 33, whereby the magnet 20 on the selected local selector is held magnetized for a time. Said circuit is exactly the same as in the former case, except that the strip 26ª connects the brushes 28 instead of the strip 26. A "holding" circuit is also formed through the master selector magnet 6, whereby it is maintained energized. Whenever the contact 16 is in line with any one of the holes 18 in the master selector that corresponds to the position of the contact 23 on any local selector, one of the strips 16ᵇ, 16ᶜ, or 16ᵈ connects the ends of the brushes 16ª. If, for instance, the instrument L³ is to be operated, then the "holding" circuit for the magnet 6 is: from battery 67, through wire 82, brush 6ª, strip 7ᵇ, wire 83, brushes 16ᵉ and contact 16ᵈ, wire 84, to magnet 6 and to battery through wire 70.

The circuit closed by the armature of relay M² for operating the trip T² is as follows: from battery 63, through wire 64, relay armature and front contact, wire 76, motor, contacts 21 and 23, wire 85 to trip-magnet 53, through wire 86 to contact 33ª and brush 30ª, to battery. Current flowing through this circuit energizes the magnet 53 on the trip T², releases the semaphore X and also the indicator-controller or repeater I as before described. The spring-actuated motor of the latter rotates the disk 55, alternately making and breaking the line circuit a number of times corresponding to the notches in said disk. A suitable indicator, as a sounder K, is connected in the usual manner to the relay Z and shows that the semaphore-releasing operation has taken place.

To prevent another operation of the instrument until desired, the selector operator removes the plug 19, and opens the switches J and H. As soon as the line is thus broken, the movable contacts on all the instruments are carried to the end of their travel by their respective motors and clutches, but produce no effect on the local apparatus, because the relays M', M², M³, are deënergized and their front contacts are not made.

This apparatus may be used for throwing any signal along a railway line and for giving orders from the despatcher's office to any station along the line, without calling any other station.

In this mechanism, it will be noted that in one current condition on the line the motors are connected by the clutches with the movable contacts of the several local selectors; that these movable contacts rest against abutments at the ends of the paths to which they can be driven by the motors, and, when thus resting against the abutments, the motors are held completely in check. The first operation is to restore the movable contacts to their initial or zero positions. This is done in the present instance by changing the current condition on the line and energizing the line relays at the various stations; whereby the motors are disconnected from the movable contacts, and thereupon the restoring mechanisms operate to move all the movable contacts back to their initial or starting positions. If then the line relays are deënergized simultaneously, the operating circuits are established through the selector magnets 20, all the clutches will be operated and simultaneously connect the motors and the movable contacts, so that all the movable contacts begin to move at the same time. Employment of a friction clutch, as shown herein, permits an instant and certain engagement of the clutch parts, no matter what their positions have been. The engagement and disengagement of the friction clutches is an important factor in the accurate operation of the present machine. After the movable contacts have been restored to their starting positions, as above described, the plug contact is set at the master selector to operate the desired translating device and the switches at the master selector are so set that current may pass through the master selector by way of its movable contact and the variable or plug contact thereon, and thence to the main line B, but the line circuit is broken until contacts at the master selector are made. All the relays at the local selectors are then deënergized, and the motors, as above explained, operate the movable contacts synchronously or in a predetermined relation to each other and to the movement of the master selector. The plug contact at the master selector has been set either for throwing a particular signal, or for ringing a bell at a particular local station. As soon as the contacts of the master selector come together, the plug contact stops the movable contact, and they remain together, because the "holding" circuit from the local battery 67 is made and maintains driving connection between the motor and the movable contact, although the latter is stopped against the plug. Current, therefore, will flow on the line until the connection between the movable contact and the plug at the master selector is broken. This flow of current on the line energizes the line relays, and breaks the operating circuit at each local selector, and causes the resetting of the movable contact to zero at each local selector, except at the selected local selector, where a holding circuit is made whereby its action is continued and its return to zero is prevented until the movable contact of the local selector has continued its connection with the fixed contact for so long as to insure action of the translating device to which that fixed contact relates. When the movable contact of the selected local selector has moved to its selecting position, corresponding to the setting of the master selector, a circuit is made including the local battery 63, through a translating device whereby the latter is energized.

In order to insure the certain operation of the mechanism, there is, in the circuit of each translating device, a circuit controller (the pair of contacts 30$^a$, 33$^a$) that is closed whenever a particular selector magnet 20 is energized by the deënergization of the line relay, but as soon as the selector magnet 20 is thus energized, a "holding" circuit is made through the contacts 30, 33 and brushes 28, in combination with the proper contact strip therefor, whereby the energization of the selector magnet 20 is maintained for a period sufficiently long to insure the proper maintenance of the circuit of the translating device. As soon, however, as the "holding" circuit is broken at the brushes 28, the selector magnet 20 is deënergized and the motors are disconnected from the movable contact, whereupon the latter drops back to zero at the selected local selector.

Fig. 11 is a diagram of the connections for a part of a modified selective system.

Figure 9:
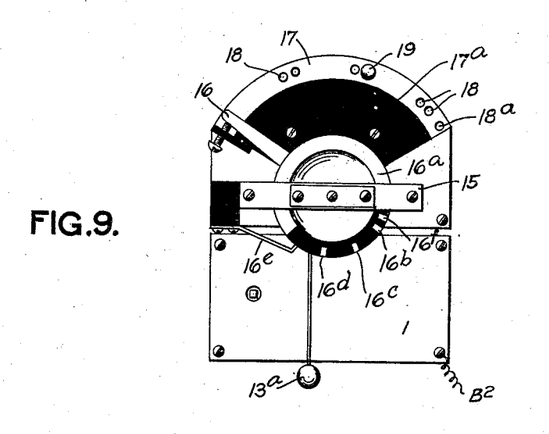
Fig. 9 is a front elevation of a modified form of master selector.
Figure 10:
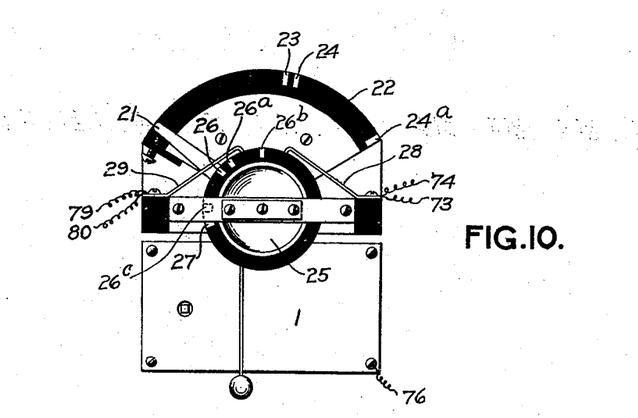
Fig. 10 is a similar view of a modified local selector.

In Fig. 9 is shown a modified form of the master selector, by means of which, in conjunction with the local selector shown in Fig. 10, the despatcher may call all the local stations on the line. For this purpose a fixed contact 24$^a$ is placed on each local selector, in the same position, and in a corresponding position on the master selector is a plug-socket 18$^a$. The despatcher, by inserting the plug 19 in the socket 18$^a$, causes the line to close when the contact 16 strikes said plug, and the contacts 21 at that instant are in corresponding positions on the local selectors, namely, on the contacts 24$^a$. A circuit is closed through the bell-magnet 35 at each local station as follows: (Fig. 11) from the battery 63, through wire 64, relay armature and front contact, wire 76, motor, contacts 21 and 24$^a$, wire 93, to magnet 35, and thence through wire 78, brushes 33$^a$ and 30$^a$ to battery. As shown in the aforesaid figures, the contact 24$^a$ is at the extreme end of the segment 22, but said contact may be placed at any desired point thereon, provided that it occupies the same position on each local selector.

In Fig. 11 the local selector is shown connected to a telegraph line, with which it is adapted to operate in a similar manner to the telephone line shown in Fig. 8. In Fig. 11 the connections for the motor magnet, etc. are omitted, and only the necessary modifications are illustrated. In a telegraph line, if any operator leaves his key open, it is impossible for the despatcher at the end of the line to call an operator at or beyond the open key. Therefore, means are provided for cutting out any open key, and at the same time breaking the ground wire at said key in case the ground-plug has been left in the board. On the frame of the local selector is mounted an electromagnet 97, having a pin 98 on its armature that supports a weight 99. Said weight when so supported, presses a spring 96 against a post 95 and so maintains a connection from the line B to the ground, through wires 94 and 96ª, and the plug or switch Z. When the weight 99 falls, it lodges between two brushes 100, and so closes a shunt circuit around the key V through the wires 101 and 102. The magnet 97 is energized from a battery 103 whenever the disk 25 is rotated. A contact 26ᵇ on the edge of said disk connects the brushes 28 when the disk has turned a short distance, and current flows through the wires 104 and 105 and the magnet 97.

In Fig. 10 the contact 26ᶜ is the connector for the brushes 28 to maintain the "holding" circuit by which the contact 21 is kept upon the contact 24ª long enough to ring the bell 34. Said "holding" circuit is the same as shown in Fig. 8, and is therefore omitted from Fig. 11. The closing of this circuit keeps the motor magnet energized after the line circuit has been closed, as in the previous case. A device is provided in this form of the invention whereby the semaphore is released to the "danger" position when the motor of the local selector at that station is run down or entirely unwound. In the motor-frame are two strips 90 and 91, that normally are a short distance apart. A lug 92 is fixed upon the motor spring or upon the primary cog-wheel, in such a position that it may strike the strip 91 when the motor is run down, and force it against the strip 90. A circuit is thereby closed through said strips, the wires 87 and 88, the battery 89, and the magnet 53 on the signal releasing mechanism. The latter then operates as hereinbefore described and the semaphore goes to "danger".

What we claim is:—

1. In an electric selecting apparatus for railway semaphores the combination of a master selector comprising automatic selecting means for effecting a current change in a conductor on the expiration of any selected one of a plurality of predetermined time intervals, and manual means for effecting a current change in said conductor; a series of local selectors each controlled by current changes in said conductor and comprising a motor having a predetermined rate of movement, two circuits one containing an electromagnet and the other containing a circuit closer operated by said motor having a predetermined time interval different at each local selector from that of any other local selector, means for controlling the motor action by said electromagnet, a circuit breaker controlled by said electromagnet for energizing one circuit or the other, a semaphore controlling device controlled by said circuit closer; and a semaphore controlled by said last mentioned controlling device.

2. In an electric selecting apparatus for railway semaphores, the combination of a master selector comprising automatic selecting means for effecting a current change in a conductor on the expiration of any selected one of a plurality of predetermined time intervals, and manual means for effecting a current change in said conductor; a series of local selectors each controlled by current changes in said conductor and comprising a motor having a predetermined rate of movement, two circuits one containing an electromagnet and the other containing a circuit closer operated by said motor having a predetermined time interval different at each local selector from that of any other local selector, means for controlling the motor action by said electromagnet, a circuit breaker controlled by said electromagnet for energizing one circuit or the other, a semaphore controlling device controlled by said circuit closer; a semaphore controlled by said last mentioned controlling device; an indicator controller in said conductor operated upon action of said semaphore; and an indicator at the master selector operated responsively with said indicator controller.

3. In an electric selecting device, the combination of a master selector having automatic selecting means for effecting the current change in a conductor on the expiration of any selected one of a plurality of predetermined time intervals, and manual means for effecting a current change in said conductor; a series of local selectors each controlled by current changes in said conductor and comprising a motor having a predetermined rate of movement, two circuits of which one contains an electromagnet and the other contains a circuit closer operated by said motor after a predetermined time interval different at each local selector from that of any other local selector, means for controlling the motor action of said electromagnet, a circuit breaker controlled by said electromagnet for energizing one circuit or the other, and a translating device controlled by said circuit closer.

4. In an electric selecting device, the combination of a master selector having automatic selecting means for effecting the current change in a conductor on the expiration of any selected one of a plurality of predetermined time intervals, and manual means for effecting a current change in said conductor; a series of local selectors each controlled by current changes in said conductor and comprising a motor having a predetermined rate of movement, two circuits of which one contains an electromagnet and the other contains a circuit closer operated by said motor after a predetermined time interval different at each local selector from that of any other local selector, a clutch between said circuit closer and said motor operated by said electromagnet, a circuit breaker controlled by said electromagnet for energizing one circuit or the other, and a translating device controlled by said circuit closer.

5. In an electric selecting device, the combination of a master selector having automatic selecting means for effecting the current change in a conductor on the expiration of any selected one of a plurality of predetermined time intervals, and manual means for effecting a current change in said conductor; a series of local selectors each controlled by current changes in said conductor and comprising a motor having a predetermined rate of movement, two circuits of which one contains an electromagnet and the other contains a circuit closer operated by said motor after a predetermined time interval different at each local selector from that of any other local selector, means for controlling the motor action of said electromagnet, a circuit breaker controlled by said electromagnet for energizing one circuit or the other, a translating device controlled by said circuit closer, an indicator controller in said conductor at each local selector set in operation upon action of said translating device, and an indicator in said conductor at the master selector operating responsively to said indicator controller.

6. In an electric selecting device, the combination of a master selector having automatic selecting means for effecting the current change in a conductor on the expiration of any selected one of a plurality of predetermined time intervals, and manual means for effecting a current change in said conductor; a series of local selectors each controlled by current changes in said conductor and comprising a motor having a predetermined rate of movement, two circuits of which one contains an electromagnet and the other contains a circuit closer operated by said motor after a predetermined time interval different at each local selector from that of any other local selector, a clutch between said circuit closer and said motor operated by said electromagnet, a circuit breaker controlled by said electromagnet for energizing one circuit or the other, a translating device controlled by said circuit closer, an indicator controller in said conductor at each local selector set in operation upon action of said translating device, and an indicator in said conductor at the master selector operating responsively to said indicator controller.

7. In an electric selecting apparatus, the combination of a master selector comprising automatic means for effecting a current change in the conductor on the expiration of any selected one of a plurality of predetermined time intervals, and manual means for effecting a current change in said conductor; a series of local selectors each controlled by current changes in said conductor and comprising a motor having a predetermined rate of movement, two circuits of which one contains an electromagnet and the other contains a circuit closer operated by said motor after a predetermined time interval different at each local selector from that of any other selector, means for connecting and disconnecting the motor and the circuit closer by action of said electromagnet, means for restoring the circuit closer to a zero position when the motor is disconnected therefrom, a circuit breaker controlled by said electromagnet for energizing one circuit or the other and actuated to break the circuit of the circuit closer while the same is returning to zero position, and a translating device controlled by said circuit closer.

8. In an electric selecting apparatus, the combination of a master selector comprising automatic selecting means for effecting a current change in the conductor on the expiration of any selected one of a plurality of predetermined time intervals, and manual means for effecting a current change in said conductor; a series of local selectors each controlled by current changes in said conductor and comprising a motor having a predetermined rate of movement, two circuits one containing an electro-magnet and the other containing a circuit closer operated by said motor having a predetermined time interval different at each local selector from that of any other local selector, means for connecting and disconnecting the motor and the circuit closer by action of said electromagnet, a translating device controlled by said circuit closer, a circuit breaker controlled by said electromagnet for making the circuit thereof for a predetermined time after action of said translating device; an indicator controller in said conductor operated upon action of said translating device; and an indicator in said conductor at the master selector operating responsively to said indicator controller.

9. In an electric selecting apparatus, the combination of a master selector comprising automatic selecting means for effecting a current change in the conductor on the expiration of any one of a plurality of predetermined time intervals, and manual means for effecting a current change in said conductor; a series of local selectors each controlled by current changes in said conductor and comprising a motor having a predetermined rate of movement, two circuits one containing an electromagnet and the other containing a circuit closer operated by said motor after a predetermined time interval different at each local selector from that of any other local selector, a clutch operated by said electromagnet for connecting and disconnecting the motor and the circuit closer, a circuit breaker operated with said clutch for energizing one circuit or the other, and a translating device controlled by the said circuit closer.

10. In an electric selecting apparatus, the combination of a master selector comprising automatic selecting means for effecting a current change in the conductor on the expiration of any one of a plurality of predetermined time intervals, and manual means for effecting a current change in said conductor; a series of local selectors each controlled by current changes in said conductor and comprising a motor having a predetermined rate of movement, two circuits one containing an electromagnet and the other containing a circuit closer operated by said motor after a predetermined time interval different at each local selector from that of any other local selector, a clutch operated by said electromagnet for connecting and disconnecting the motor and the circuit closer, a translating device controlled by said circuit closer, a circuit breaker operated with said clutch for breaking the circuit of the circuit closer upon operation of said translating device, and for making the circuit of the electromagnet.

11. In an electric selecting apparatus, the combination of a master selector comprising variable automatic selecting means for effecting a current change in a conductor on the expiration of any selected one of a plurality of predetermined time intervals, and manual means for effecting a current change in said conductor; a series of local selectors each controlled by current changes in said conductor and comprising a motor having a predetermined rate of movement and selecting means for effecting a current change upon the expiration of a predetermined time interval different at each local selector from that of any other local selector, two circuits one containing an electromagnet and the other containing the said circuit closer, means for controlling the action of the motor upon said circuit closer by said electromagnet, a circuit breaker controlled by said electromagnet for energizing one circuit or the other, and a translating device controlled by said circuit closer.

12. In an electric selecting apparatus, the combination of a master selector comprising variable automatic selecting means for effecting a current change in a conductor on the expiration of any selected one of a plurality of predetermined time intervals, and manual means for effecting a current change in said conductor; a series of local selectors each controlled by current changes in said conductor and comprising a motor having a predetermined rate of movement and selecting means for effecting a current change upon the expiration of a predetermined time interval different at each local selector from that of any other local selector, a clutch operated by said electromagnet for connecting and disconnecting the motor and said circuit closer, means for restoring the circuit closer to a zero position when the clutch is disconnected therefrom, a translating device controlled by said circuit closer, a circuit breaker operated by said clutch for energizing one circuit or the other and constructed to break the circuit of the circuit closer while it is returning to its zero position.

13. In an electric selecting apparatus, the combination of a master selector comprising variable automatic selecting means for effecting a current change in a conductor on the expiration of any selected one of a plurality of predetermined time intervals, and manual means for effecting a current change in said conductor; a series of local selectors each controlled by current changes in said conductor and comprising a motor having a predetermined rate of movement and selecting means for effecting a current change upon the expiration of a predetermined time interval different at each local selector from that of any other local selector, a clutch operated by said electromagnet for connecting and disconnecting the motor and said circuit closer, means for restoring the circuit closer to a zero position when the clutch is disconnected therefrom, a translating device controlled by said circuit closer, a circuit breaker operated by said clutch for energizing one circuit or the other; an indicator controller in said conductor operated upon action of said translating device; and an indicator at the master selector operated responsively to said indicator controller.

SELDEN R. WRIGHT.
CHARLES L. DEIHLE.

Witnesses:
C. W. Carroll,
D. Gurnee.